(12) United States Patent
Hourquebie et al.

(10) Patent No.: US 6,798,554 B2
(45) Date of Patent: Sep. 28, 2004

(54) FLEXIBLE ELECTROCHROME STRUCTURE AND METHODS FOR THE PRODUCTION THEREOF

(75) Inventors: Patrick Hourquebie, Esvres sur Indre (FR); Patrice Topart, Sillery (CA); Hubert Pages, Tours (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/332,979

(22) PCT Filed: May 29, 2002

(86) PCT No.: PCT/FR02/01807
§ 371 (c)(1),
(2), (4) Date: Jan. 23, 2003

(87) PCT Pub. No.: WO02/097519
PCT Pub. Date: Dec. 5, 2002

(65) Prior Publication Data
US 2004/0012869 A1 Jan. 22, 2004

(30) Foreign Application Priority Data
May 31, 2001 (FR) .......................................... 01 07144

(51) Int. Cl.⁷ ............................................... G02F 1/15
(52) U.S. Cl. ....................... 359/265; 359/270; 359/267; 359/269; 359/273
(58) Field of Search .................................. 359/265, 270, 359/267, 269, 273, 275; 252/62.2, 583, 582, 586

(56) References Cited

U.S. PATENT DOCUMENTS

| | | | |
|---|---|---|---|
| 3,844,636 A | | 10/1974 | Maricle et al. |
| 3,944,333 A | | 3/1976 | Leibowitz |
| 4,893,908 A | * | 1/1990 | Wolf et al. ................. 359/275 |
| 5,446,577 A | * | 8/1995 | Bennett et al. ............. 359/273 |
| 5,995,273 A | * | 11/1999 | Chandrasekhar ............ 359/270 |

FOREIGN PATENT DOCUMENTS

| | | |
|---|---|---|
| JP | 03 067227 | 3/1991 |
| WO | 94/16356 | 7/1994 |

OTHER PUBLICATIONS

J.S. Hale et al.: "Visible and infrared optical constants of electrochromatic materials for emissivity modulation applications" Thin Solid Films, vol. 313–314, pp. 205–209 Feb. 01, 1998.

P. Topart et al.: "Infrared switching electroemissive devices based on highly conducting polymers" Thin Solid Films, vol. 352, pp. 243–248 1999.

* cited by examiner

Primary Examiner—Joseph Martinez
(74) Attorney, Agent, or Firm—Oblon, Spivak, McClelland, Maier & Neustadt, P.C.

(57) ABSTRACT

The present invention concerns a flexible electrochrome structure operating in reflection at wavelengths between 0.35 and 20 $\mu$m. It comprises a microporous membrane including an electrolyte and, deposited on each of the surfaces of the microporous membrane, in a symmetrical manner in relation to said membrane, successively and in this order: a layer forming a reflecting electrode, a layer of electrochrome conductive polymer, and a flexible window transparent to wavelengths between 0.35 and 20 $\mu$m.

30 Claims, 2 Drawing Sheets

FLEXIBLE ELECTROCHROME STRUCTURE AND METHODS FOR THE PRODUCTION THEREOF

DESCRIPTION

1. Technical Field

The present invention concerns a flexible electrochrome structure. It also concerns manufacturing methods for said structure.

The electrochrome structures of the present invention are modulable reflection systems operating in a wide spectral range going from the visible to the mid-infrared, in other words from wavelengths between 0.35 and 20 µm.

They therefore have numerous applications. For example, said structures are good flexible display devices operating both in the visible and infrared ranges. They also have a place, in particular, in the aerospace sector by making it possible to control thermal exchanges on space objects such as satellites.

2. State of the Prior Art

Electrochromism consists in modifying the optical properties of a material under the influence of an electric potential. Electrochrome structures allow electrochromism to be exploited, particularly in the aforementioned applications.

Overall, electrochrome structures may be broken down into two types: electrochrome structures operating in transmission and those operating in reflection.

In a device that operates in transmission, all of the incident radiation passes through the device and is attenuated in a modulable manner. In a device that operates in reflection, the device is firstly opaque, in other words no radiation passes through it, the incident radiation is then reflected in a modulable manner.

The present invention concerns structures of the second type.

Document WO-A-94/16356 by R. Bennett details two types of modulable reflection electrochrome devices. In the first type of device, the electrochrome layer is located on the metallic electrode, but towards the exterior of the device. It is therefore outside of the electric field created by the two electrodes. In order to allow the compensation of the charge in the electrochrome layer during electrochemical processes, a porous substance that is metallised and impregnated with electrolyte is used. The first device proposed is unsymmetrical, and the substrate of the counter electrode is located at the rear of the device. In the second device proposed, the device is symmetrical; the central porous substrate acts as a support for the working electrode and the counter electrode. The device can therefore operate on two sides.

It is stated, in this document, that the system operates over the whole spectral range, including infrared. However, for the two assemblies described, the position of the electrolyte in front of the active material and the reflective layer would imply the use of an electrolyte that is transparent in the infrared range. However this is not possible, since liquid and solid electrolytes are, by their vibration bands, absorbent in the mid-infrared range. The two assemblies proposed are therefore not suitable for use in the infrared.

Infrared electrochrome systems based on tungsten oxide $WO_3$ have recently been produced. An example of such a system is described, for example, in J. S. Hale, M. DeVries, B. Dworak and J. A. Woollam, Thin Solid Films 313–314, 205–209 (1998). The device proposed, based on the variation of optical indexes of $WO_3$ by electrochemical doping, nevertheless has the disadvantage of being rigid and unfortunately cannot be made flexible by replacing the substrate used by polymers. The design of the device remains conventional, since the electrochrome materials and the counter electrode remain in the electric field created by the two electrodes. A gold grid is used as electrode of the $WO_3$ in order to be transparent to infrared radiation. The device thus has an operation in which the active material ($WO_3$) shows a contrast in reflectance. Moreover, it should be noted that the contrasts obtained in the mid-infrared range remain too low.

A similar device, in which tungsten trioxide is replaced by a conductive polymer, polyaniline, has been proposed in the document by P. Topart and P. Hourquebie, Thin Solid Films, 352, 243–2418 (1999). However, the device remains rigid and is based on a traditional battery type design, where the active material remains in the electric field.

The document U.S. Pat. No. 5,995,273 of P. Chandrasekhar describes a device that enables a contrast in absorbance of a layer of conductive polymer during its doping/undoping electrochemical process. The conductive polymer is deposited on a porous metallised substrate which plays the role of electrode, reflector and ionic conductor. Two designs of the system are proposed. In both cases, as in the case of the patent of Bennett cited above, the active layer of conductive polymer is situated outside of the electric field created by the two electrodes. The porous substrate impregnated with electrolyte then allows ionic conductivity between the two electroactive layers. The first design proposed by P. Chandrasekhar is very similar to that of R. Bennett with a PE film in intimate contact with a layer of conductive polymer. In the second design of the device proposed, the counter electrode is no longer, like in the first, parallel to the optically active electrode, but it is coiled up and placed on each side of the system.

However, producing the proposed structures is difficult and complex. In addition, the thickness of said structures is too high.

DESCRIPTION OF THE INVENTION

The present invention makes up for the aforementioned disadvantages of the prior art, by providing a flexible electrochrome structure operating in reflection at wavelengths of between 0.35 and 20 µm.

The electrochrome structure of the present invention comprises a microporous membrane including an electrolyte and, deposited on each of the surfaces of the microporous membrane, in a symmetrical manner in relation to said membrane, successively and in this order: an electrode formed from a reflecting and electronically conductive layer, a layer of electrochrome conductive polymer, and a flexible window transparent to wavelengths between 0.35 and 20 µm.

The basic principle of the structures of the present invention is therefore the total symmetry of the structure, the two faces of the structure having the same electrochrome properties.

According to a specific embodiment of the electrochrome structure of the present invention, the microporous membrane may be composed of a first and a second microporous membrane assembled surface against surface. This embodiment is described below in relation to the methods of the present invention and in the examples.

The microporous membrane is composed of one or several material(s) chosen as a function of the different elements that make up the electrochrome structure. For example, when the layer forming a reflecting electrode is a layer of metal, the microporous membrane is preferably composed of a material that may be metallised. Preferably, the material is compatible with the conductive polymer and the electrolyte, it has sufficient mechanical strength to play the role of a substrate, and it has a temperature resistance that allows it to withstand the temperature to which it may be subjected during the manufacture of the structure, for examples at temperatures near to 100° C. under pressure. Moreover, its porosity makes it possible for the electrolyte that is introduced into it to have sufficient ionic conductivity. In addition, once metallised, it has a high specular reflectance. To ensure this, the diameter of the pores is advantageously chosen in such a way as to remain substantially less that the wavelength of the radiation that one wishes to reflect. It should be noted that by modifying the size of the pores of the microporous membrane, it is possible to control the specular and diffuse parts of the reflected radiation.

Many polymers can meet the aforementioned specifications such as, for example, polymer films of any kind perforated mechanically or by laser ablation, fabrics, etc. According to the invention, the microporous may be composed, for example, of one or several of the following materials: a poly(propylene), a poly(ethylene terephthalate), a poly(methyl methacrylate), a poly(ethyl methacrylate), a polytetrafluoroethylene and other $C_1$ to $C_8$ fluorinated poly (alkylenes), a polyamide, a poly(vinylidene fluoride), an acrylic resin such as a synthetic methyl methacrylate resin, a synthetic acrylate resin, and a poly(methyl methacrylate) type polymer, a methyl acrylate and acrylonitrile copolymer, an ethylene vinyl acetate, a fluorinated ethylene propylene resin, a polyester, a polycarbonate, a polybutylene, a poly (vinyl chloride), a polyurethane, a polyimide, a porous woven or non-woven textile, a paper, and a paper filter, a microfiltration membrane.

Advantageously, the microporous membrane may be a membrane in polyamide, polyester, polycarbonate or poly (vinylidene fluoride).

The inventors have obtained very good results with microporous membranes usually used for microfiltration. They have in fact mechanical properties that allow them to be self-supporting and to allow high pore densities.

Obviously, the selection criteria will remain the chemical compatibility with the layer forming a reflecting electrode, for example the metal, the conductive polymer and the electrolyte, but also the porosity and low surface coarseness allowing a high specular reflectance.

Membranes whose pores are formed by ion bombardment seem to be the most suitable. In fact they have sufficient pore density to obtain good ionic conductivities but, above all, their very low surface coarseness ensures, for example after metallisation, a specular reflectance that can exceed 95% in the near infrared. This does not exclude the use of other techniques for forming the pores, for example those described in document U.S. Pat. No. 5,995, 273.

The inventors have observed that the reduction in the thickness of the microporous membrane(s) makes it possible, apart from reducing the overall thickness of the device, to limit the resistance between the two layers of conductive polymers and thus to increase the electrochemical doping/undoping of the conductive polymer and, as a consequence, to reduce the optical response time.

Cyclopores (trade mark) microporous membranes from Whatman of 10 μm thickness and made of polyester with pore sizes that can reach 0.1 μm, and porosities of 4% are sufficient to make the device work electrochemically. For example, specular reflectances greater than 95% are obtained in the mid-infrared with such microporous membranes metallised with 50 nm of gold and pores of diameter 0.1 μm. The same membranes in polycarbonate may be used; on the other hand, their solubility in numerous organic media favour their use in aqueous media. Other types of membranes in nylon (trade mark), in other words in polyamide, or polyester, PVDF, may also be used. They generally have higher pore densities, but on the other hand higher coarsenesses, which limits the specular reflectance, to the benefit of the diffused.

The inventors have also observed that the high pore densities of microporous membranes, in other words above 100 000 pores/cm$^2$ and which can reach 10$^8$ pores/cm$^2$, make it possible to increase the contacts between the electrolyte and conductive polymer and thus limit or eliminate "start up" problems with the device which occur in the devices described by P. Chandrasekhar in the aforementioned document of the prior art, and also to reduce the response times. Thus, according to the invention, the micropores of the microporous membrane advantageously have a density greater than 100 000 pores/cm$^2$.

According to the invention, the reflecting electrode is for example a layer of metal. The metals that can be used and the methods for depositing them in thin layers are known to those skilled in the art and they have already been extensively described in the technique in question.

If the visible spectral range is targeted, metals such as silver or platinum are the most suitable. But to obtain good wide band reflectances and in particular in the infrared range (>90%), gold is the most suitable metal. Moreover, gold has remarkable elasticity properties and electrochemical stability and is compatible with the conductive polymers, dopants and electrolytes used.

The minimum thickness of the layer of metal advantageously makes it possible to obtain percolation enabling conductivity and reflectivity. This is about 40 nm for gold. According to the invention, the reflecting electrode may thus be a layer of gold having a thickness of around 40 nm.

In absolute terms, any conductive polymer may be suitable for forming the layer of conductive polymer of the structure of the present invention. Preferably, those with good infrared transparency in their oxidised or reduced states, with sufficient mechanical properties, a high level of electrochemical doping, a good chemical stability and a high cyclability are preferred. The presence of several colours during the electrochemical oxidation may also be of great interest for the visible spectral range.

The wide range of conductive polymers cited in the document U.S. Pat. No. 5,995,273 summarises the most suitable polymers inventoried in laboratories for the present invention.

According to the invention, the electrochrome conductive polymer may comprise, for example a material chosen from among polyaniline, polythiophene, and polypyrrole and a dopant. Preferably, the layer of electrochrome conductive polymer comprises a material chosen from among polydiphenylamine, poly(4-amino biphenyl), poly(3-alkyl ($C_1$ to $C_8$) thiophenes), polydiphenyl benzidine, polyphenylene, poly(phenylene vinylene), a poly(allylene vinylene), a poly(amino quinoline), poly(3,4-ethylenedioxy thiophene) and its derivatives, or derivatives or copolymers of these and a dopant.

Thicknesses of several hundreds of nanometers, in other words from 50 to 1000 nm, of the layer of conductive polymer are sufficient to make the device work.

As regards the dopant, the organic sulphonates widely used in the domain of conductive polymers seem the most suitable. The use of sulphonated polymeric dopants makes it possible to increase the mechanical strength of the polymers, especially in the case of conductive polymers with low molecular weights, and to favour, in numerous cases, the optical contrast in the infrared spectral range.

According to the invention, the dopant may be chosen from among, for example, tosylate (p-toluene sulphonate), naphthalene sulphonate, dodecylbenzene sulphonate, polystyrene sulphonate (PSS), polyvinyl sulphonate (PVS), polyanethosulphonate, poly (2-acrylamido-2-methylpropane sulphonate) (PAMPS), etc.

The sulphonates are preferably soluble in the chosen polymerisation medium. If this is not the case, an exchange of cations may allow solubility in organic solvents less polar than water. Quaternary ammonium salts with quite long alkyl chains are very suitable for this.

According to the invention, the electrolyte may be aqueous or solid but, preferably, it retains sufficient ionic conductivity. The role of the electrolyte is primordial in the optical operation of the device in the infrared range. The important factor is the choice of the dopant/electrolyte pair in order to obtain a high contrast in the mid-infrared during the doping/undoping process of the conductive polymer.

According to the invention, the electrolyte may be chosen in the form of an organic solvent, such as propylene carbonate, diglyme, butyrolactone, ethylene carbonate, dimethyl carbonate or a mixture of these solvents. As regards the ions, the sulphonates cited above as dopants are very suitable, as well as organic ions such as bis((trifluoromethyl) sulphonyl) imide (TFSI) and cations from the imidazolium family.

The electrolyte may also contain polymeric compounds in such a way as to gel it such as, for example, ethylene polyoxide or polymers from the polyacrylate family.

The choice of materials for forming the flexible window transparent in the spectral range from the visible to the mid-infrared according to the invention is limited. At the present time there is no flexible material that allows good transparency in the mid-infrared. In fact, the only really flexible materials are organic polymers that have absorbent vibration bands in the mid-infrared. According to the invention, the following materials are suitable for forming the window: a material chosen from among poly(ethylene terephthalate) and other polyesters, polyethylene, polypropylene, poly(methyl methacrylate), poly(ethyl methacrylate), acrylic resins such as synthetic methyl methacrylate resins, synthetic acrylate resins, a poly(methyl methacrylate) type thermoplastic polymer, a copolymer of methyl acrylate and acrylonitrile, an ethylene vinyl acetate, a fluorinated ethylene propylene resin, a $C_1$ to $C_8$ fluorinated poly(alkylene), a polyvinylic alcohol and a poly(ethylene glycol), polyvinyl chloride, or a mixture of these.

Among all the available polymers, the inventors have observed that polyethylene has the best transparency in the infrared range. Moreover, it exhibits good mechanical properties.

In order to limit the infrared absorption of the film forming the flexible and transparent window, its thickness is preferably kept as low as possible, while at the same time retaining the barrier properties vis á vis the exterior environment. In general, a thickness of between 5 and 100 $\mu$m is suitable.

In the example of a film of low density polyethylene, a thickness of between 15 and 50 $\mu$m is suitable.

In the structure of the present invention, the two layers of conductive polymer are situated "on the exterior" of the device, outside of the electric field created by the application of a potential between the two metallic electrodes. However, in an unexpected manner, the electrochrome structure operates very well electrochemically.

In the case of the devices of P. Chandrasekhar described above, only the layer of the active conductive polymer is outside of the electric field. The counter electrode part is a "traditional" type.

The present invention also concerns methods for manufacturing the electrochrome structure of the invention.

A first method of manufacturing the electrochrome structure of the present invention comprises, in this order, the following steps:
  -i- depositing on the two surfaces of a microporous membrane a layer forming a reflecting electrode.
  -ii- depositing a layer of electrochrome conductive polymer on each of the layers forming a reflecting electrode deposited in step -i-.
  -iii- depositing a flexible window transparent to wavelengths between 0.35 and 20 $\mu$m on each of the layers of electrochrome conductive polymer deposited in step -ii-.
  -iv- introducing an electrolyte into the microporous membrane.
  -V- sealing the electrochrome structure thus obtained.

A second method of manufacturing the electrochrome structure of the present invention comprises, in this order, the following steps:
  -a- depositing on one of the two surfaces of a first microporous membrane and on one of the two surfaces of a second microporous membrane a layer forming a reflecting electrode, the other surfaces of the two microporous membranes remaining bare.
  -b- depositing a layer of electrochrome conductive polymer on each of the layers forming a reflecting electrode deposited in step -a-.
  -c- depositing a flexible window transparent to wavelengths between 0.35 and 20 $\mu$m on each of the layers of electrochrome conductive polymer deposited in step -b- in such a way as to obtain two electrochrome semi-structures.
  -d- assembling the two electrochrome semistructures obtained in step -c- in such a way that the two bare surfaces of the two microporous membranes are one against the other.
  -e- introducing an electrolyte into the microporous membranes of the two semi-structures assembled in step -d-, and
  -f- sealing the electrochrome structure thus obtained.

The different materials that can be used in said methods are described above.

According to the invention, when the layer forming the reflecting electrode is a layer of metal, it may be deposited for example by a metallisation process, for example by means of thermal evaporation or magnetron sputtering. Said processes are known to those skilled in the art.

According to the invention, the layer of conductive polymer is preferably deposited by electrochemical polymerisation in liquid medium comprising the monomer(s) corresponding to the polymer to deposit, and the dopant. According to the invention, in order to obtain polymers of better quality, organic solvents are preferred to water to constitute the liquid medium for the electrodeposition when the monomer is soluble both in the organic solvent and in water.

The flexible and transparent window may for example be deposited on each of the layers of electrochrome conductive polymer by hot press moulding, for example at 100° C. for a polyethylene window.

The present invention concerns a novel design of flexible, wide band electrochrome devices aiming to simplify and facilitate the assembly of the different components of the system without however altering the desired optical properties.

The first method of manufacture of the present invention consists therefore in only using a single porous substrate and carrying out the same operations on its two faces: first depositing the layers forming the reflecting electrode, for example by metallisation, then depositing the layers of conductive polymer, for example by electrodeposition of the conductive polymer, and finally, putting in the flexible window, for example of polyethylene film by press moulding, introducing the electrolyte and sealing the structure.

The second method of manufacture of the present invention consists schematically in manufacturing two exactly identical semi-structures from two porous substrates, called above the first and second microporous membranes, by the steps -a- and -b-. The layer forming the reflecting electrode is deposited on only one of the two surfaces of each of the substrates, then the conductive polymer is deposited, for example electrochemically. The two semi-structures may then be assembled bare surface against bare surface of the microporous membranes by hot press moulding of the two flexible windows, made up for example of two thin films of polyethylene, laid over the two layers of conductive polymer. The electrode can then be introduced into the porous substrates via an orifice specifically left for this purpose. The device is then sealed, for example by heat sealing. Another assembly possibility is putting in the window, for example a film of polyethylene (PE), on each semi-structure for example by hot press moulding, then assembling the semi-structures, which at the same time seals the device.

According to the invention, steps -c- and -d- may therefore be carried out either simultaneously or successively.

The deposition of the conductive polymers, for example electrochemically, may thus be simultaneous and the assembly of the components of the structure may be carried out in a single operation by simple pressing of the multilayer between the flexible windows, for example between two films of polyethylene.

The simplicity of assembly is therefore demonstrated, even if each step requires rigorous handling.

The devices obtained thereof make it possible to generate important contrasts in reflection over a wide spectral range from the visible up to the mid-infrared, from 0.35 to 20 $\mu$m. Since the design of the structures of the present invention is totally symmetrical, forming the different layers and their assembly are made much easier, and it makes it possible to limit the number of different steps for forming and assembling the components of these electrochrome systems. Moreover, the present invention makes it possible to obtain very thin flexible electrochrome devices, less than 100 $\mu$m, generally between 80 and 500 $\mu$m, with very short optical response times, less than 1 second. The structures of the present invention also have the advantage of operating on their two faces simultaneously but in an inverse manner: one side is a reflector while the other is absorbent, and vice versa.

The device proposed by P. Chandrasekhar is complex as regards the assembly and does not enable the aforementioned results to be obtained. The present invention facilitates the construction of electrochrome structures, while at the same time adding the numerous aforementioned advantages, especially regarding their thicknesses and the double-face operation.

The structure of the present invention may be used for example for the manufacture of flexible display devices that operate in the visible and infrared range, and for the manufacture of thermal exchange control devices, for example on space objects.

Other characteristics and advantages will become clearer to those skilled in the art on reading the following examples, given purely by way of illustration and in nowise limitative, and by referring to the appended drawings.

EXAMPLES

The specular reflectance measurements were carried out on a Fourier transform infrared spectrometer, the incident beam having an angle of 7.5° in relation to the normal, and the reference being a gold mirror.

Example 1

The devices produced had a square active surface of 2.5×2.5 cm$^2$. Two Cyclopores (trade mark) microporous membranes, with a pore diameter of 0.1 $\mu$m, in polyester were metallised by spraying with 50 nm of gold. An electrochemical deposition of conductive polymer was then carried out successively or simultaneously on the two metallised membranes. To achieve this, an aqueous solution saturated in 3,4-ethylenedioxy thiophene (EDOT) containing sodium poly(4-styrene sulphonate) (NaPVS) at a concentration of 0.1M (monomer equivalent). The deposition was carried out in a galvanostatic manner with a current density of 0.5 mA/cm$^2$.

After washing with water and acetonitrile and then drying the film, the membranes were assembled and encapsulated with two films of LDPE (low density polyethylene) with a thickness of 30 $\mu$m. The two membranes were deposited back to back then a film of PE was deposited on the two thin layers of conductive polymer of each membrane. The whole assembly was then hot press moulded (120° C.) for two minutes.

The electrolyte, in this instance a 0.1M aqueous solution of NaPVS, was then introduced via a syringe through a small orifice previously left between the two films of PE. The orifice was then sealed by heating.

The device, thus sealed, was very flexible and mechanically resistant, with a thickness less than 150 $\mu$m and exhibited an infrared contrast above 30% in the III infrared band. The inventors also observed the low charge consumed during the reflector—absorbent transition, which was around 1 mC/cm$^2$.

Figure 3:
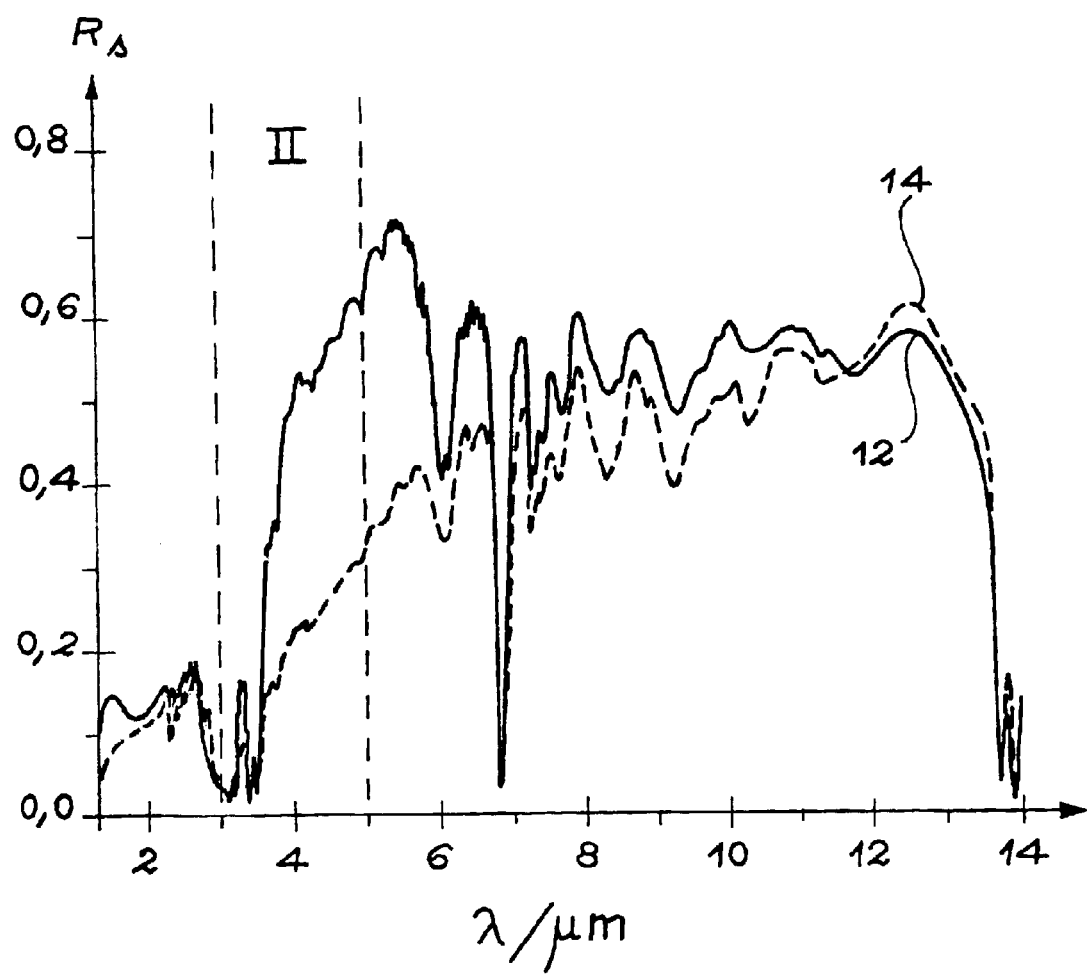
FIG. 3 is a graph showing the contrast in the infrared spectral range of the structure of the present invention.

Due to the PEDOT, a change of colour, from pale transparent blue to dark blue, occurred during the oxidation—reduction process. The contrast in the infrared spectral range is shown in the graph in FIG. 3. In this figure, Rs indicates the specular reflectance; $\lambda/\mu m$ indicates the wavelength in microns; reference 12 indicates the specular reflectance at the potential −1.4 V; and reference 14 indicates the specular reflectance at the potential +1.4 V. It may be seen that it is particularly important in band II of the infrared (between the vertical dotted lines in FIG. 3).

Moreover, due to the symmetry of the device, said device operates optically on its two faces in an opposite manner, when one face is reflective, the other is absorbent, and vice versa.

Figure 1:
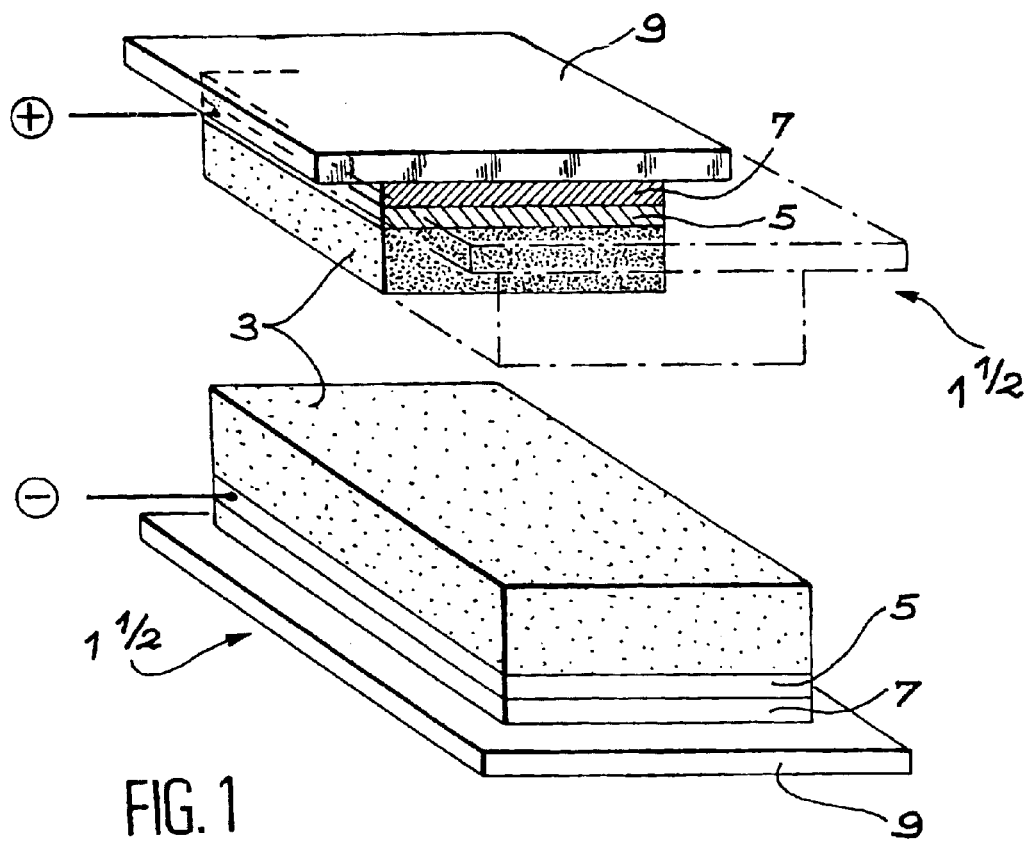
FIG. 1 is a schematic representation of the second method of manufacture of the structure of the present invention.

FIG. 1 is a schematic representation of this example illustrating the second method of manufacturing the structure of the present invention. In this figure, reference $1^{1/2}$ indicates a semi-structure according to the invention; reference 3 indicates the microporous membrane impregnated with electrolyte; reference 5 indicates the layer forming the reflecting electrode, in the present example it is a layer of gold; reference 7 indicates the layer of conductive polymer; and reference 9 indicates the flexible and transparent window also called the optical window.

Example 2

The device is identical to example 1, the dopant and the electrolyte being different.

Tosylate poly(4-styrene sulphonate), which was used as dopant and as electrolyte, was replaced by sodium tetraethyl ammonium (TEATOS). The visible contrast from pale transparent blue to blue also took place.

On the other hand, unlike example 1, the inventors observed that the contrasts in the near infrared (NIR) and in the mid-infrared (MIR) did not take place "in the same sense": when the device is more reflective in the NIR, it is more absorbent in the MIE, and vice versa.

The remarks concerning the rapidity of the system and the double-face aspects brought about by the symmetry of the device remain the same as in example 1.

Example 3

The assembly technique was the same as in the previous examples, but the materials used were different.

Magna (trade mark) microporous membranes, comprised of nylon (trade mark), with a pore size of 0.1 $\mu$m, with higher porosity than the Cyclopores membranes in the two preceding examples, were metallised. Films of polydiphenyl amine (PDPA) were electrochemically deposited from a solution of acetonitrile containing 0.1M of diphenyl amine (DAP) and 0.1M of tetraethyl ammonium poly(2-acrylamido-2-methylpropane sulphonate) (TEAPAMPS). The electrolyte used was an organic solution of diglyme (DG) containing 1 m of lithium bis((trifluoromethyl) sulphonyl) imide (LiTFSI).

In the visible range, the polydiphenyl amine exhibited several colours during its electrochemical oxidation, going from pale transparent yellow to green, then to dark blue. In the infrared spectral range, the contrast in reflectance reached around 40% in band II (2–5 $\mu$m) and 30% in band III (8–12 $\mu$m), the system showing a good visible and infrared reflectance in the transparent state (>50%).

It will be seen that the devices have an electrochrome operation on each face, when one is reflective, the other is absorbent, and vice versa. This stems directly from the present invention, linked to the symmetry of the structure.

Example 4

The same materials as in examples 1 to 3 were used, except that a single microporous membrane was used. The successive depositions were carried out according to the first method of manufacture of the present invention.

The results obtained in this example were substantially identical to those of the previous examples, with the same performance levels.

Figure 2:
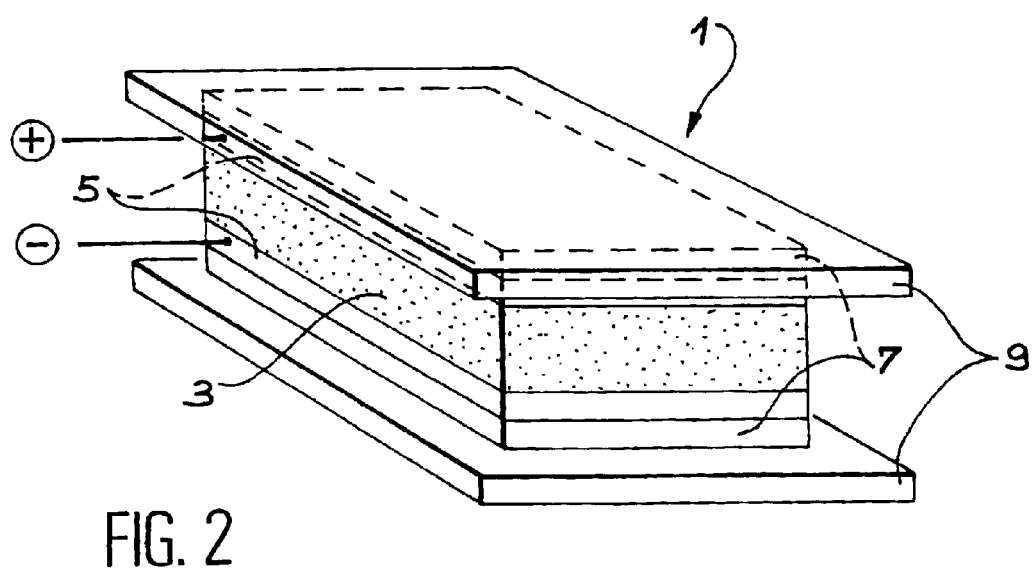
FIG. 2 is a schematic representation of an electrochrome structure of the present invention.

FIG. 2 is a schematic representation of an electrochrome structure of the present invention as obtained in this example. This structure may also be, for example, the result of assembling the two semi-structures shown in FIG. 1. The identical references in FIGS. 1 and 2 indicate the same elements. Moreover, in this figures, reference 1 indicates the structure according to the present invention.

What is claimed is:

1. Flexible electrochrome structure operating in reflection at wavelengths between 0.35 and 20 $\mu$m comprising a microporous membrane including an electrolyte and, deposited on each of the surfaces of the microporous membrane, in a symmetrical manner in relation to said membrane, successively and in this order: an electrode formed from a reflecting electronically conductive layer, a layer of electrochrome conductive polymer, and a flexible window transparent to wavelengths between 0.35 and 20 $\mu$m.

2. Electrochrome structure according to claim 1, in which the microporous membrane is composed of two microporous semi-membranes assembled surface against surface.

3. Structure according to claim 1, in which the microporous membrane is composed of one or several of the materials selected from the group consisting of a poly (propylene), a poly(ethylene terephthalate), a poly(methyl methacrylate), a poly(ethyl methacrylate), a polytetrafluoroethylene, a $C_1$ to $C_8$ fluorinated poly (alkylene), a polyamide, a poly(vinylidene fluoride), an acrylic resin, methyl methacrylate resin, a synthetic acrylate resin, a poly(methyl methacrylate) polymer, a methyl acrylate, acrylonitrile copolymer, an ethylene vinyl acetate, a fluorinated ethylene propylene resin, a polyester, a polycarbonate, a polybutylene, a poly(vinyl chloride), a polyurethane, a polyimide, a porous woven or non-woven textile, a paper, a paper filter, and a microfiltration membrane.

4. Structure according to claim 1, in which the microporous membrane is a membrane in a material selected from the group consisting of a polyamide, a polyester, a polycarbonate and a poly(vinylidene fluoride).

5. Structure according to claim 1, in which the micropores have a density greater than 100 000 pores/cm$^2$.

6. Structure according to claim 1, in which the layer forming a reflecting electrode is a layer of metal.

7. Structure according to claim 1, in which the reflecting electrode is a layer of metal selected from the group consisting of silver, platinum and gold.

8. Structure according to claim 1, in which the reflecting electrode is a layer of gold.

9. Structure according to claim 1, in which the reflecting electrode is a layer of gold with a thickness of around 40 nm.

10. Structure according to claim 1, in which the layer of electrochrome conductive polymer comprises a material selected from the group consisting of polyaniline, polythiophene and polypyrrole and a dopant.

11. Structure according to claim 10, in which the dopant is a sulphonated polymeric dopant.

12. Structure according to claim 10, in which the electrolyte is selected from the group consisting of propylene carbonate, diglyme, butyrolactone, ethylene carbonate, dimethyl carbonate, a sulphonate, an organic ion, bis ((trifluoromethyl)sulphonyl)imide, a imidazolium cation and a mixture thereof.

13. Structure according to claim 1, in which the layer of electrochrome conductive polymer comprises a material selected from the group consisting of polydiphenylamine, poly(4-amino biphenyl), a poly(3-alkyl ($C_1$ to $C_8$)thiophene, polydiphenyl benzidine, polyphenylene, poly(phenylene vinylene), a poly(allylene vinylene), a poly(amino quinoline), poly(3,4-ethylenedioxy thiophene), a derivative thereof and copolymers thereof and a dopant.

14. Structure according to claim 13, in which the dopant is selected from the group consisting of tosylate, naphthalene sulphonate, dodecylbenzene sulphonate, polystyrene sulphonate, polyvinyl sulphonate, poloanethosulphonate, and poly(2-acrylamido-3-methylpropane sulphonate).

15. Structure according to claim 13, in which the dopant is a sulphonated polymeric dopant.

16. Structure according to claim 13, in which the dopant is selected from the group consisting of tosylate, naphthalene sulphonate, dodecylbenzene sulphonate, polystyrene sulphonate, polyvinyl sulphonate, polyanethosulphonate, and poly(2-acrylamido-2-methylpropane sulphonate).

17. Structure according to claim 1, in which the flexible and transparent window is composed of a material selected from the group consisting of poly(ethylene terephthalate), a polyester, polyethylene, polypropylene, poly(methyl methacrylate), poly(ethyl methacrylate), an acrylic resin, synthetic methyl methacrylate resins, synthetic acrylate resins, a poly(methyl methacrylate) thermoplastic polymer, a copolymer of methyl acrylate and acrylonitrile, an ethylene vinyl acetate, a fluorinated ethylene propylene resin, a $C_1$ to $C_8$ fluorinated poly(alkylene), a polyvinylic alcohol and poly(ethylene glycol), polyvinyl chloride, and a mixture thereof.

18. Structure according to claim 1, in which the flexible and transparent window is composed of polyethylene.

19. Structure according to claim 1, in which the flexible and transparent window is composed of a film of polyethylene having a thickness of between 15 and 50 $\mu$m.

20. Flexible display device comprising a structure according to claim 1.

21. Heat exchange control device comprising a structure according to claim 1.

22. Method for manufacturing a flexible electrochrome structure operating in reflection at wavelengths between 0.35 and 20 $\mu$m comprising, in this order, the following steps:
 -i- depositing on the two surfaces of a microporous membrane a layer forming a reflecting electrode;
 -ii- depositing a layer of electrochrome conductive polymer on each of the layers forming a reflecting electrode deposited in step -i-;
 -iii- depositing a flexible window transparent to wavelengths between 0.35 and 20 $\mu$m on each of the layers of electrochrome conductive polymer deposited in step -ii-;
 -iv- introducing an electrolyte into the microporous membrane; and
 -v- sealing the electrochrome structure thus obtained.

23. Method according to claim 22, in which the layer forming the reflecting electrode is a layer of metal and it is deposited by a metallisation process.

24. Method according to claim 23, in which the metallisation process is a thermal evaporation process or a magnetron sputtering process.

25. Method according to claim 22, which the layer of conductive polymer is deposited by electrochemical polymerization in a liquid medium comprising the monomer(s) corresponding to the polymer to be deposited, and a dopant.

26. Method according to claim 25, in which the liquid medium is an organic solvent when the monomer(s) is (are) soluble in organic solvents.

27. Method according to claim 22, in which the flexible and transparent window is bonded to each of the layers of electrochrome conductive polymer by hot press molding.

28. Method for manufacturing a flexible electrochrome structure operating in reflection at wavelengths between 0.35 and 20 $\mu$m comprising, in this order, the following steps:
 -a- depositing on one of the two surfaces of a first microporous membrane and on one of the two surfaces of a second microporous membrane, a layer forming a reflecting electrode, the other surfaces of the two microporous membranes remaining bare;
 -b- depositing a layer of electrochrome conductive polymer on each of the layers forming a reflecting electrode deposited in step -a-;
 -c- depositing a flexible window transparent to wavelengths between 0.35 and 20 $\mu$m on each of the layers of electrochrome conductive polymer deposited in step -b- in such a way as to obtain two electrochrome semi-structures;
 -d- assembling the two electrochrome semi-structures obtained in step -c- in such a way that the two bare surfaces of the two microporous membranes are one against the other;
 -e- introducing an electrolyte into the microporous membranes assembled in step -d-; and
 -f- sealing the electrochrome structure thus obtained.

29. Method according to claim 28, in which steps -c- and -d- are carried out simultaneously.

30. Method according to claim 28, in which steps -c- and -d- are carried out successively.

* * * * *